Patented Aug. 19, 1941

2,252,706

UNITED STATES PATENT OFFICE 2,252,706

HALOALKYL POLYACYL GLYCOSIDES

Harold W. Coles and Mary L. Dodds, Pittsburgh, Pa., assignors to E. R. Squibb & Sons, New York, N. Y., a corporation of New York No Drawing. Application October 20, 1938, Serial No. 236,045

8 Claims. (Cl. 260—210)

This invention relates to, and has for its object the provision of, certain haloalkyl polyacyl glycosides.

The glycosides of this invention are comprised by the general formula

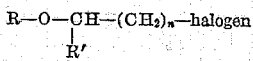

wherein R—O— is the glycoside radicle of a polyacyl saccharide, R' is a member of the group consisting of hydrogen, lower alkyl and halo-lower-alkyl, and $n$ is an integer under 10, preferably under 5. The "glycoside radicle" is, of course, the radicle formed by removal of the H from the terminal OH group of a sugar. These glycosides, which have been isolated in pure, crystalline form, are valuable as intermediates in the production of numerous derivatives, such as choline glycosides; those glycosides in which the glycoside radicle is that of a polyacyl disaccharide, and those in which R' is a halo-lower-alkyl are especially important.

The glycosides of this invention may be prepared by reacting an acylhalo sugar (e. g. β-acetobromoglucose) with an alkylene halohydrin in the presence of silver oxide or silver carbonate, preferably the latter. The reaction may be effected in the presence of a solvent, for example benzene. It is desirable that the reactants be of a good grade of purity, especially that they contain no appreciable amount of free acid. The reaction is preferably effected at room temperature, but may be effected at higher temperatures if due caution is exercised. The usual aceto-bromo-sugar reactant may be replaced by the corresponding benzoylhalo- or acylchloro-sugar.

The following examples are illustrative of the invention:

Example 1

*Tetraacetyl-β-d-(β-chloroethyl) glucoside*

25.2 g. ethylene chlorohydrin and 6 g. β-acetobromoglucose are mixed with 7.2 grams of silver carbonate. A lively evolution of carbon dioxide takes place and the flask contents are allowed to stand over night in complete darkness at room temperature. The silver salts are removed by filtration and washed with some hot absolute alcohol. The alcohol filtrate is then transferred to a small distilling flask where the alcohol and excess ethylene chlorohydrin are removed in a vacuum. The residue is taken up in hot absolute alcohol, filtered and, on cooling, the tetraacetyl-β-d-(β - chloroethyl) - glucoside starts to crystallize out. The crystallization is completed by immersion of the partly crystalline contents in ice-water. The crystals are then filtered off by means of a small Buchner funnel, and washed well with cold absolute alcohol. They may be recrystallized from a minimum of hot absolute alcohol.

The tetraacetyl-β-d-(β-chloroethyl)-glucoside consists of needle-like crystals and has the probable formula

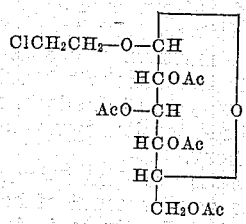

in which the Ac represents the acetyl (CH₃CO) group. The needles have a rather sharp melting point of 114° C. and when placed on the tongue have no taste at first, but gradually a bitter taste develops. The crystals do not reduce Benedict's solution, showing that the glycoside group is present. The crystals are easily soluble in acetone, hot alcohol and hot water. In acetone solution, the crystals showed an optical rotation of $$[\alpha]_D^{28} = -21.25°$$

Example 2

*Tetraacetyl-β-d-(gamma-chloropropyl) glucoside*

This glucoside is prepared in a manner similar to Example 1, except that 29.7 grams of pure trimethylene chlorohydrin are used in place of the ethylene chlorohydrin.

The glucoside has the probable formula:

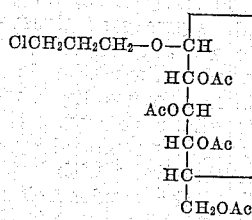

The needle-like crystals have a melting point of 74° C. and a rotation in acetone of $$[\alpha]_D^{27.5} = -12.25°$$

Example 3

*Tetraacetyl-β-d-(β-bromoethyl) glucoside*

This glucoside is prepared in a manner similar to Example 1 except that 39.1 grams of ethylene bromohydrin are used instead of the ethylene chlorohydrin. This new glucoside crystallizers in the form of long needles of the probable formula:

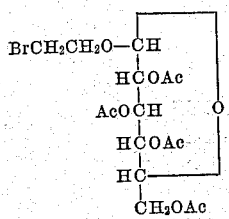

The crystals melted at 117.3° C., and exhibited an optical rotation value in acetone of $$[\alpha]_D^{27.5°} = -20.5°$$

EXAMPLE 4

*Tetraacetyl-β-d-(di-bromomethyl-methyl) glucoside*

6 g. of β-acetobromoglucose, 7.2 grams of silver carbonate and 68.1 grams of α, gamma-dibromoglycerol are weighed out into an Erlenmeyer flask and the reaction, which is much slower than that with the monohalo-hydrins, is allowed to proceed overnight in total darkness. The flask contents are then cautiously warmed on a waterbath for one hour.

The silver salts are then filtered off, and are washed with a small amount of hot absolute alcohol. The alcohol filtrate is then cautiously treated with distilled water to throw out the condensation product without throwing out the excess dibromoglycerol which is likewise insoluble in water. Gradual chilling of this alcohol-water solution causes the formation of needles which are filtered by suction, washed with an ice-cold alcohol-water mixture and are dried in a vacuum desiccator. These crystals melt at 107.5° C.

This glucoside has the probable formula:

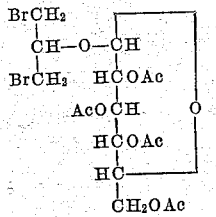

EXAMPLE 5

*Tetraacetyl-β-d-(di-chloromethyl-methyl) glucoside*

13 g. β-acetobromoglucose, 7.2 grams of silver carbonate and 20 grams of glycerol α, gamma-dichlorohydrin are allowed to react slowly with the evolution of carbon dioxide overnight in darkness. The mixture is then cautiously warmed for one hour on a water-bath.

The silver salts are removed by filtration and are washed several times with hot ethyl alcohol to remove all of the condensation product. A considerable amount of water is then added to the alcohol filtrate whereupon the condensation product is thrown out as a syrup. The supernatant water solution containing the excess dichlorohydrin is decanted, and the syrupy residue is taken up in warm alcohol. The alcohol solvent is gradually removed by suction whereupon crystals start to form. Water is cautiously added to complete the precipitation.

The crystals are obtained by suction and are washed with a chilled alcohol-water mixture. For purification, the crystals are dissolved in a minimum of hot alcohol, and chilled gradually. They have a melting point of 122-3° C.

The probable structure of this glucoside is:

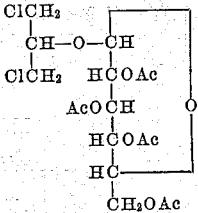

EXAMPLE 6

*Triacetyl-β-d-(β-chloroethyl) xyloside*

18 g. ethylene chlorohydrin, 5 g. β-acetobromoxylose and 5 g. silver carbonate are mixed together and are allowed to stand at room temperature in complete darkness for 24 hours. The filtrate, secured after removal of the silver salts and subsequent washings with alcohol, is treated with a comparatively large amount of distilled water, whereupon crystals of the desired glycoside will start to separate out on standing. Chilling with ice completes the precipitation. These long needles are filtered on to a Büchner funnel, washed with ice-cold alcohol, and are dried in the air. They are recrystallized from a minimum of hot alcohol by the addition of a small amount of water. The crystals melt at 137° C. The probable formula is:

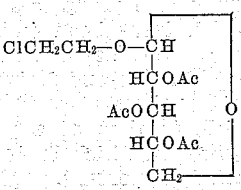

EXAMPLE 7

*Triacetyl-β-d-(di-bromomethyl-methyl) xyloside*

This glycoside is prepared in a manner similar to Example 4, except that β-acetobromoxylose is used in place of β-acetobromoglucose. The xyloside melts at 156-7° C.

Its probable formula is:

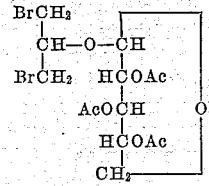

EXAMPLE 8

*Triacetyl-β-d-gamma-chloropropyl xyloside*

This xyloside is prepared according to the directions given under Example 6, except that trimethylene chlorohydrin is employed instead of ethylene chlorohydrin. The crystals melt at 108.5–109° C.

Its probable formula is:

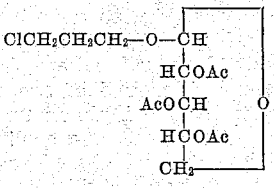

EXAMPLE 9

*Tetrabenzoyl-β-d-(β-chloroethyl) glucoside*

This glucoside is obtained as the result of the reaction between 18 g. ethylene chlorohydrin, 6 g. β-benzobromoglucose and 5 g. silver carbonate. The reaction is much less vigorous than the corresponding reaction involving β-acetobromoglucose. The reactants are allowed to stand for 24 hours at room temperature in darkness and are then warmed carefully on a water-bath for several hours.

The silver salts are removed by filtration and washing with hot alcohol, and the alcohol filtrate is treated with a considerable amount of distilled water which throws out the condensate as a syrup. The supernatent liquid is decanted, the residue chilled and washed several times with water, and finally the syrupy residue is taken up in hot alcohol. Water is added and the solution is strongly chilled in ice whereupon the syrup partly crystallizes. On working up with ice and a glass rod, the crystallization will be practically complete. The cubical crystals melt at 59° C. The probable structure of this glucoside is:

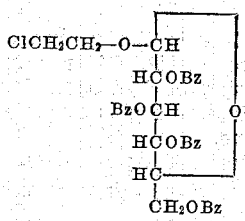

in which Bz represents the benzoyl ($C_6H_5CO$) radical.

EXAMPLE 10

*Heptaacetyl-β-d-(β-chloroethyl) lactoside*

18 g. of ethylene chlorohydrin, 6 g. β-acetobromolactose (137° C.) and 5 g. silver carbonate are allowed to react at room temperature in total darkness for two days. The silver salts are removed by filtration and washed with some hot absolute alcohol. A considerable amount of water is added to the filtrate, to which the wash alcohol has been added, whereupon a mobile syrup is thrown out of solution. The supernatant liquid is decanted, the mobile syrup is then taken up in a minimum of hot absolute alcohol, filtered, and iced distilled water is added cautiously to the alcohol. A cloudy liquid is produced, and a sticky solid comes out. The sticky solid, on rubbing with a glass rod and by treatment with ice, goes over completely to a solid condition. This solid, on removal and subsequent drying in the air, is recrystallized from chloroform by the addition of petroleum ether. The melting point is indefinite, being about 78–80° C.

This compound is assigned the probable structure:

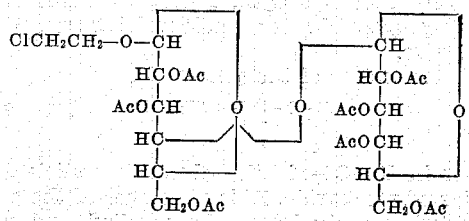

EXAMPLE 11

*Heptaacetyl-β-d-(gamma-chloropropyl) lactoside*

This lactoside may be prepared in a manner similar to that described under Example 10, except that trimethylene chlorohydrin is used in place of ethylene chlorohydrin.

The heptaacetyl - β - d -(gamma-chloropropyl) lactoside, after repeated purification, melts around 80° C.

The probable formula is:

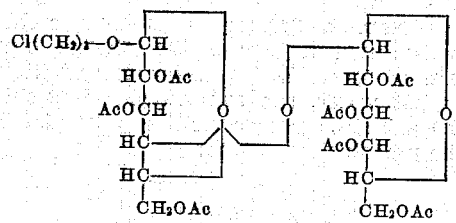

EXAMPLE 12

*Heptaacetyl-β-d-(α-methyl-β-chloroethyl) lactoside*

18 g. propylene chlorohydrin (chloro-isopropyl alcohol), 5 g. silver carbonate and 5 g. β-acetobromolactose are mixed together and a lively evolution of carbon dioxide takes place. The mixture is allowed to stand overnight at room temperature in complete darkness.

The silver salts are filtered off and are washed with some hot absolute alcohol. The alcohol filtrate is chilled and cold water is added, whereupon a gummy mass is thrown out. The clear supernatant liquid is decanted and the gummy residue is washed several times with ice-water. The gummy material is then dissolved in a small amount of hot absolute alcohol, which is then chilled and treated cautiously with cold water. Rubbing of the side of the flask with a glass rod aids in the formation of the white, solid condensate which is then worked up in the usual manner. Several recrystallizations from chloroform by throwing out with petroleum ether gives heptaacetyl-β-d-(α-methyl - β - chloroethyl) lactoside melting at 100° C.

The structure of this compound is believed to be

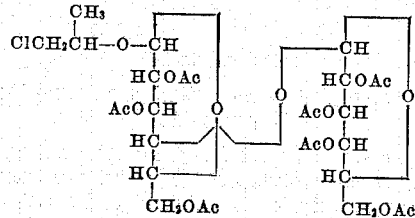

EXAMPLE 13

*Tetraacetyl-β-d-(β-bromoethyl) galactoside*

18 g. ethylene bromohydrin, 5 g. β-acetobromogalactose and 5 g. silver carbonate are mixed together and allowed to stand overnight in complete darkness with occasional shaking. A moderate reaction will take place. This reaction mixture, after removal of the silver salts, is worked up identically as described in Example 12.

For recrystallization, the crystals are dissolved in hot water, and water is then removed by vacuum until the crystallization starts. The crystallization is completed by chilling. The crystals melt at 111° C.

The galactoside is the following:

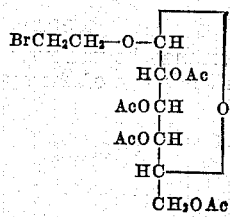

Example 14

*Tetraacetyl-β-d-(β-chloroethyl) galactoside*

This galactoside is prepared in a manner similar to Example 13, except that ethylene chlorohydrin is used in place of the ethylene bromohydrin of Example 13. After recrystallization from hot water, the tetraacetyl-β-d-(β-chloroethyl) galactoside has a melting point of 117° C.

The probable formula is:

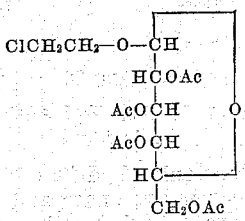

Example 15

*Tetraacetyl-β-d-(gamma-chloropropyl) galactoside*

4 g. β-acetobromogalactose, 5 g. silver carbonate and 18 g. trimethylene chlorohydrin are mixed together and allowed to react at room temperature in total darkness. The reaction is not as vigorous as with the ethylene halohydrins. The remainder of the preparation is the same as described under Example 13. Recrystallized from hot water, the tetraacetyl-β-d-(gamma-chloropropyl) galactoside melts at 78° C.

The probable structure is:

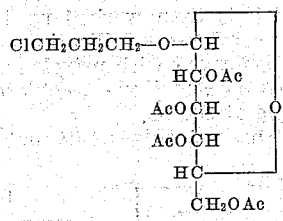

Example 16

*Tetraacetyl-β-d-(α-methyl-β-chloro-ethyl) glucoside*

5 g. silver carbonate, 7 g. β-acetobromoglucose and 20 g. propylene chlorhydrin are combined together in a flask and allowed to react together for several days. The silver salts are filtered off, washed with hot alcohol, and water is added to the filtrate. A mobile syrup will separate, which is washed several times with cold water. Crystals are obtained by solution of the syrup in a small amount of absolute alcohol and removal of the solvent gradually by vacuum. The crystals so obtained melt at 113° C.

This compound has the formula:

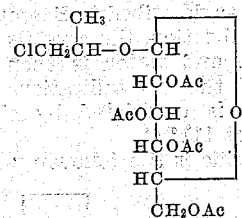

The invention may be variously otherwise embodied, within the scope of the appended claims. We claim:

1. Glycosides of the general formula

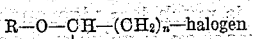

wherein R—O— is the glycoside radicle of a polyacyl saccharide, R' is a member of the group consisting of hydrogen, lower alkyl and halo-lower-alkyl, and $n$ is a whole number from 1 to 9 inclusive.

2. Glycosides of the general formula

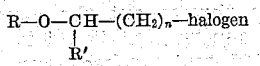

wherein R—O— is the glycoside radicle of a polyacyl saccharide, R' is a member of the group consisting of hydrogen, lower alkyl and halo-lower-alkyl, and $n$ is a whole number from 1 to 4 inclusive.

3. Glycosides of the general formula

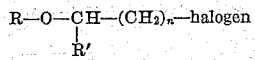

wherein R—O— is the glycoside radicle of a polyacyl disaccharide, R' is a member of the group consisting of hydrogen, lower alkyl and halo-lower-alkyl, and $n$ is a whole number from 1 to 4 inclusive.

4. Glycosides of the general formula

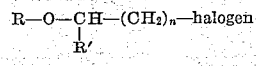

wherein R—O— is the glycoside radicle of a polyacyl saccharide, R' is a halo-lower-alkyl, and $n$ is a whole number from 1 to 4 inclusive.

5. Glycosides of the general formula

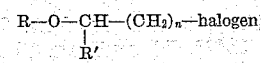

wherein R—O— is the glycoside radicle of a polyacetyl saccharide, R' is a member of the group consisting of hydrogen, lower alkyl and halo-lower-alkyl, and $n$ is a whole number from 1 to 4 inclusive.

6. Glycosides of the general formula

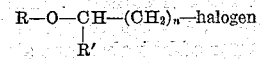

wherein R—O— is the glycoside radicle of a polybenzoyl saccharide, R' is a member of the group consisting of hydrogen, lower alkyl and halo-lower-alkyl, and $n$ is a whole number from 1 to 4 inclusive.

7. Glycosides of the general formula

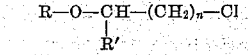

wherein R—O— is the glycoside radicle of a polyacyl saccharide, R' is a member of the group consisting of hydrogen, lower alkyl and halo-lower-alkyl, and $n$ is a whole number from 1 to 4 inclusive.

8. Glycosides of the general formula

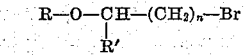

wherein R—O— is the glycoside radicle of a polyacyl saccharide, R' is a member of the group consisting of hydrogen, lower alkyl and halo-lower alkyl, and $n$ is a whole number from 1 to 4 inclusive.

HAROLD W. COLES.
MARY L. DODDS.